Figure 1:
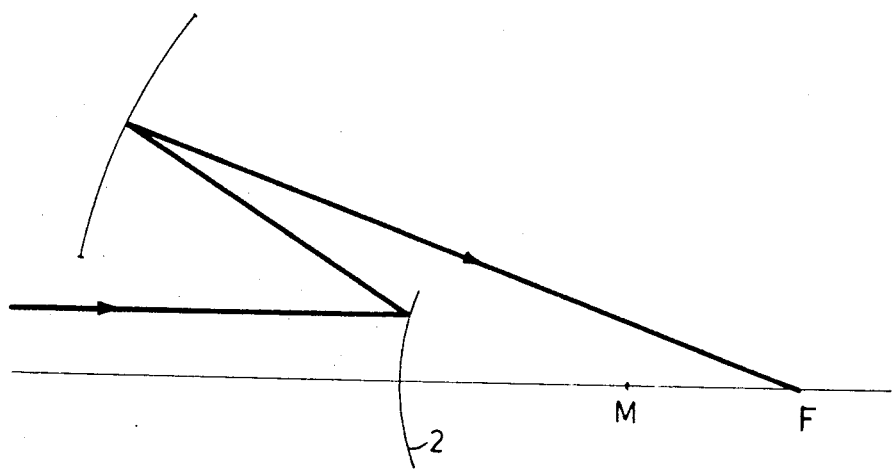

United States Patent
Hardeman, deceased et al.

[15] 3,707,325

[45] Dec. 26, 1972

[54] OPTICAL IMAGING SYSTEM

[72] Inventors: George Eduard Gerard Hardeman, deceased, late of Eindhoven, Netherlands; Casper Antonius Henricus Mulkens, administrator, Hugo de Grootplein 35, Eindhoven, Netherlands

[22] Filed: July 23, 1970

[21] Appl. No.: 57,674

[30] Foreign Application Priority Data

Aug. 16, 1969 Netherlands ..................6912510

[52] U.S. Cl..................................350/294, 350/199
[51] Int. Cl............................G02b 5/10, G02b 17/06
[58] Field of Search..........................350/294, 55, 199

[56] References Cited

UNITED STATES PATENTS 2,380,887  7/1945  Warmisham..................350/294 UX

OTHER PUBLICATIONS

J. Dyson, et al, Anf/i Streak Camera, 70(9) Journal of the Smpte 725–730 (9–961)

Primary Examiner—David Schonberg
Assistant Examiner—John W. Leonard
Attorney—Frank R. Trifari

[57] ABSTRACT

An optical imaging system is described which includes a mirror system comprising a convex spherical mirror and an apertured concave spherical mirror having coincident principal axes. It is shown that by placing a plane mirror and a second convex spherical mirror in the path taken by the rays which emerge from the mirror system the focal distance can be increased, resulting in an acceptable light-shadow ratio with a non-excessively large aperture and also in a very good correction for spherical aberration.

4 Claims, 3 Drawing Figures

OPTICAL IMAGING SYSTEM

The invention relates to an optical imaging system which includes a mirror system comprising a convex spherical mirror and an apertured concave spherical mirror, the optical axes of which mirrors coincide.

Such a mirror system is used inter alia for focussing radiation in wavelength ranges for which no suitable lens material is available. The system is also used when the images have to satisfy stringent requirements with respect to achromatism.

A known such system is the Cassegrainian system. In this system the incident rays are reflected by the concave mirror to the convex mirror. After being focussed by the convex mirror the ray beam emerges from the system through an opening in the concave mirror. This arrangement is not entirely corrected for spherical aberration. For satisfactory correction, however, the mirrors must have radii of curvature such, and be relatively positioned so, that the rays can no longer emerge from the system through the opening in the concave mirror but are reflected back into the system by the concave mirror. It is possible to provide correction by means of an aspherical plate placed in the ray path, however, manufacture of aspherical plates is difficult and hence they are expensive.

Satisfactory correction for the spherical aberration without using aspherical plates is possible for a system which may be regarded as a "reversed" Cassegrainian system. In this system the rays enter the system through the opening in the concave mirror, fall on the convex mirror and are reflected towards the concave mirror by the convex mirror. The concave mirror focusses the ray beam onto a point external to the mirror system.

This mirror system has very little spherical aberration, because the spherical aberration of one mirror is cancelled by the spherical aberration of the other. By a suitable choice of the ratio between the radii of curvature of the concave and convex mirrors a mirror system is obtainable which is entirely free from third-order spherical longitudinal aberration. The term "longitudinal aberration" is to be understood to mean herin the deviation of the real image point of an object point from the mathematically paraxially calculated image point of the said object point in a direction parallel to the optical axis. For a concentric mirror system, i.e. a mirror system in which the centers of curvature of the mirrors coincide, this ratio is 0.40. By causing the centers of curvature to coincide the astigmatism is eliminated and in addition the optimum light-shadow ratio is obtained.

A disadvantage of this mirror system in general, and hence of the "0.40 system" also, is that rays incident through the opening in the concave mirror close to the optical axis are reflected by the convex mirror through the same opening in the concave mirror out of the system, i.e. they emerge in the same direction in which they have entered. Those rays of the beam of incident rays which extend within a cylinder of a given radius about the optical axis are lost. As a result the illumination, which is determined by the effective relative aperture, is reduced. The effective relative aperture is the relative aperture of an ideal objective which gives the same illumination as the reversed Cassegrainian system with the attendant shadow effects. Only with a very large aperture of the concave mirror and hence with a very large diameter of the concave mirror will the useful radiation fraction become acceptably great. The term "useful radiation fraction" is used herein to mean the ratio between the rays which are not intercepted by the convex mirror and the total quantity of rays incident on the concave mirror. However, the large aperture in turn provides difficulty in respect of the correction for spherical aberration. Another disadvantage is the small depth of focus.

It is an object of the present invention to obviate the said disadvantages. For this purpose the invention is characterized in that a plane mirror and a second convex spherical mirror are placed in this order in the path of the rays which emerge from the mirror system. In a preferred embodiment of a system according to the invention the concave spherical mirror and the first convex spherical mirror have a common center of curvature. The ratio between the radii of curvature of the concave mirror and of the first convex mirror is again adapted so as to compensate for the spherical aberration of the second convex mirror. In addition to the known effect of the rays being "folded up" the advantage is obtained that the focal distance of the four-component system is greater than that of the first mentioned mirror system. The term "focal distance" is used herein to denote the distance between the focus of the entire mirror system and the point of intersection of the ray directed to the focus and the ray entering the system. By increasing the focal distance an acceptable light-shadow ratio is obtainable with a not excessively large aperture, while overmore a very good correction for spherical aberration is achieved. With given requirements in respect of the effective relative aperture, the focal distance and the image field the proposed four-component system not only has a smaller length but also a smaller diameter than a two-component system satisfying the same requirements. The light-shadow ratio of the proposed mirror system is far better than that of the known mirror system, so that in order to obtain a given effective relative aperture a smaller relative aperture can be used in the proposed mirror system than in the known mirror system. Owing to its smaller relative aperture the four-component system according to the invention has a greater depth of focus greater than in the two-component system. The relative aperture is determined by the quotient $d/f$, where $d$ is the size of the entrance pupil and $f$ is the focal distance.

Figure 2:
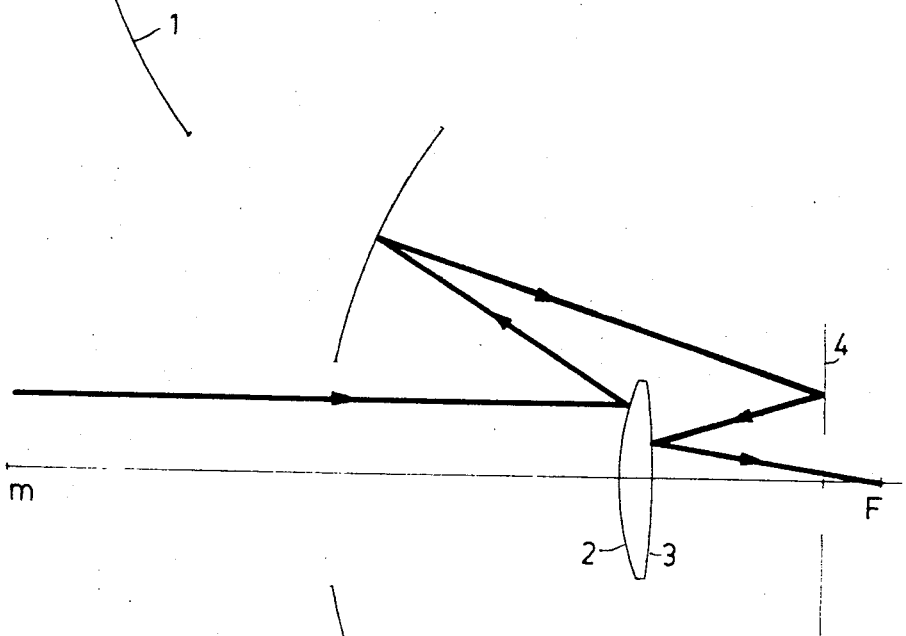
Figure 3:
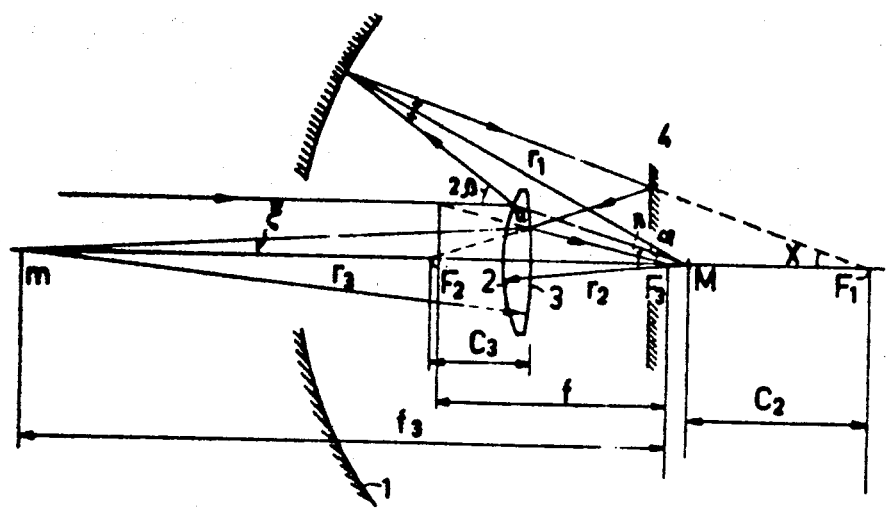

An embodiment of the invention will now be described, by way of example, with reference to the accompanying diagrammatic drawings, in which:

FIG. 1 shows the path taken by the rays in the known two-component mirror system, FIG. 2 illustrates the path taken by the rays in a four-component system according to the invention, and FIG. 3 shows the various parameters of this four-component system.

Referring now to FIG. 1, a radiation beam falls through an opening in a concave mirror 1 on a convex mirror 2. The beam is reflected by the convex mirror to the concave mirror, which focusses it in a focus F. In this and in the following figures M is the common center of curvature of the concave spherical mirror and the first convex spherical mirror.

In the system according to the invention shown in FIG. 2, the beam focussed by a concave mirror 1 falls on a plane mirror 4, which reflects it to a convex mirror 3. This mirror focusses the beam in a point $F_3$. In this Figure, $m$ is the center of curvature of the second convex spherical mirror 3.

The path taken by the rays in the mirror system shown in FIG. 2 can be calculated with reference to FIG. 3. In this Figure the unit of length is the radius of curvature $r_1$ of the concave mirror 1. Experiments have shown that it is advantageous to place the plane mirror 4 at a distance of $0.10 \, r_1$ to the left of M, i.e. between the mirror 2 and M. The position of the image point of an object at infinity is calculated as a function of the angle of incidence $\beta$ between the incident ray and the normal to the convex mirror 2. The maximum value of the angle of incidence $\beta$ determines the edge of the convex mirror 3 and hence the entrance pupil. The edge of this mirror is spaced from the optical axis by a distance given by : $r_2 \sin \beta_{max}$ and, viewed in the direction of the optical axis, may coincide with the edge of the mirror 2. In view of its mounting, the double mirror 2, 3 must have a certain thickness and hence the edge of the mirror 3 lies at a distance of $0.02 \, r_1$ to the right of the edge of the mirror 2.

From the Figure it can be calculated that for the distance between $f_3$ and $m$ one has :

$$f_3 = r_3 \cos \xi + r_3 \sin \xi \cot \nu ,$$

where $\nu$ and $\xi$ are functions of $\beta$.

For the focal distance $f$ one has:

$$f = r_2 \sin \beta \cot \nu .$$

$f_3$ is the distance between the point $m$, which has a fixed location in the system, and the focus of the four-component system. This distance must be as constant as possible.

$f$ can be calculated for a given value of $f_3$. The value of $\beta_{max}$ was chosen to be 22°. The interval of effective rays then is given by : $14° \leq \beta \leq 22°$, for the rays having an angle of incidence $\beta$ for which $0 \leq \beta \leq 14°$ are intercepted by the convex mirror 2. The values of $f_3$ and $f$ as a function of $\beta$ were calculated by means of a computer. The following values were found for radii of curvature $r_2 = 0.47 \, r_1$ and $r_3 = 1.30 \, r_1$:

|     | $f_3$ | $f$ |
|-----|-------|-----|
| 14° | 1.67850 $r_1$ | 0.68708 $r_1$ |
| 15° | 1.67841 | 0.68490 |
| 16° | 1.67834 | 0.68259 |
| 17° | 1.67829 | 0.68015 |
| 18° | 1.67825 | 0.67759 |
| 19° | 1.67824 | 0.67491 |
| 20° | 1.67826 | 0.67212 |
| 21° | 1.67831 | 0.66923 |
| 22° | 1.67841 | 0.66623 |

The mean value of these values for $f_3$ can be determined. Since the number of rays between $\beta$ and $\beta + d\beta$ is proportional to $\sin \beta \cos \beta \, d\beta$, this function is the weighting function by which one must multiply to find the mean value of $f_3$. The mean value was also calculated by means of a computer: $\overline{f_3} = 1.67833$. The associated value of $\overline{f}$ is about $0.67 \, r_1$. For the reversed Cassegrainian system shown in FIG. 1 the focal distance was $0.31 \, r_1$.

If the image plane passes through $F_3$, the radius of the disc of least confusion is given by $$cc = \left| (f_3(\beta) - \overline{f_3}) \right| \tan \nu ; \text{ the mean value is}$$

$$\overline{cc} = \frac{\sum_\beta cc(\beta) \sin 2\beta}{\sum_\beta \mu \sin 2\beta}$$

This mean value was calculated by means of the computer:

$$\overline{cc} \approx 0.125 \times 10^{-4} \, r_1.$$

This value cannot be obtained by means of a two-component system of the same rapidity. Owing to the diffraction the confusion will be greater except for the ultraviolet region.

For the aforedescribed embodiment using angles of incidence between 14° and 22° the effective relative aperture $(f/d)_{ef} = 2.53$ with a useful light diffraction of 0.56.

Extending the two-component system to include the mirrors 3 and 4 will give rise to only a slight astigmatism. The virtual intermediate image at $F_2$ is completely free from astigmatism. The reflection at the mirror 3 produces only higher order astigmatism.

The field curvature of the four-component system is considerable. The virtual image plane at $F_2$ has a radius of curvature $k_2$ equal to $MF_1$. The radius of curvature of the final image plane through $F_3$ is given to a good approximation by:

$$(1/k_2) + (1/r_3) = 1/k_3$$

When the radiation beam is to be concentrated on a single detector, the field curvature is of no importance. This is the case, for example, in astronomy, when weak radiation from a point source at infinity is to be measured. If the detection system comprises a linear array of detectors, the disadvantage of the field curvature can be cancelled by arranging the detector elements on a curve of radius $k_3$. Thus, the curvature of the array of detectors will always be matched, because, irrespective of the instantaneous position of the scanning mirror preceding the system, the rays from objects at infinity will always be parallel to the plane containing the curve of the array of detectors and the optical axis.

The four-component system may be used for accurate focussing of radiation throughout the frequency range from the short-wave ultraviolet to deep in the infrared region.

When the system is used to produce a thermal image of an object on a detector, care must be taken to ensure that no thermal radiation from the environment reaches the detector. This can be achieved in that all the elements of the optical system which are situated within the field of view of the detector are made reflecting and are given a curvature such that the centers of curvature coincide with the point on the axis at which the detector is located.

What is claimed is:

1. An optical imaging system which comprising a convex spherical mirror, an apertured concave spherical mirror the optical axes of which mirrors coincide, said mirrors having a common center of curvature, whereby a beam of radiation passing through an aperture in the concave mirror and impinging on the convex mirror will be reflected on to the surface of the concave mirror, a plane mirror in the path of the radiation from the concave mirror, and a second convex spherical mirror in the path of the radiation from the plane mirror.

2. An optical imaging system as claimed in claim 1, wherein the ratio between the radii of curvature of the spherical mirrors is such that the system is corrected for spherical aberration.

3. An optical imaging system as claimed in claim 1 wherein the plane mirror is located between the first convex mirror and the common center of curvature at a slight distance in front of this center.

4. An optical imaging system as claimed in claim 1, wherein the spacing between the edges of the first and second convex mirrors is equal to 0.02 times the radius of the concave mirror.

* * * * *